(12) United States Patent
Plessala, Jr.

(10) Patent No.: US 7,549,483 B2
(45) Date of Patent: Jun. 23, 2009

(54) FURROW/DITCH CLEANER APPARATUS

(76) Inventor: Erne Plessala, Jr., 5205 Gondron Rd., New Iberia, LA (US) 70563

( * ) Notice: Subject to any disclaimer, the term of this patent is extended or adjusted under 35 U.S.C. 154(b) by 377 days.

(21) Appl. No.: 11/433,179

(22) Filed: May 12, 2006

(65) Prior Publication Data

US 2006/0266534 A1  Nov. 30, 2006

Related U.S. Application Data

(63) Continuation-in-part of application No. 10/860,444, filed on Jun. 3, 2004, now abandoned.

(51) Int. Cl.
 *A01B 21/02* (2006.01)
 *A01B 79/00* (2006.01)
(52) U.S. Cl. .......................... 172/554; 172/1
(58) Field of Classification Search .............. 172/63, 172/64, 72, 122, 176, 177, 518, 540, 118, 172/119, 121, 123, 174, 548, 552, 554; 56/249, 56/294; 37/366, 368
See application file for complete search history.

(56) References Cited

U.S. PATENT DOCUMENTS

| | | | |
|---|---|---|---|
| 419,892 A | | 1/1890 | Schumacher |
| 630,947 A | | 8/1899 | Terrell |
| 907,721 A | | 12/1908 | Boak |
| 918,677 A | * | 4/1909 | Jones ................ 172/174 |
| 1,069,264 A | | 8/1913 | Keller |
| 1,284,385 A | | 11/1918 | Linden |
| 1,500,502 A | | 7/1924 | Kuhn |
| 2,098,738 A | | 11/1937 | Campbell |
| 2,118,363 A | | 5/1938 | Schwarz |
| 2,176,984 A | | 10/1939 | Adkinson |
| 2,228,389 A | | 1/1941 | Garey |
| 2,236,832 A | | 4/1941 | Nielsen |
| 2,613,585 A | | 10/1952 | Calkins |
| 2,944,612 A | * | 7/1960 | Rood, Jr. et al. ............ 172/118 |
| 3,061,103 A | | 10/1962 | Mitchell |
| 3,071,197 A | * | 1/1963 | Larson ................ 172/99 |
| 3,104,723 A | | 9/1963 | Skalka |
| 3,297,096 A | | 1/1967 | Woolridge |
| 3,516,182 A | | 6/1970 | Wykert |
| 3,624,826 A | * | 11/1971 | Rogers ................ 37/92 |
| 3,633,681 A | | 1/1972 | Sipala |
| 3,704,575 A | * | 12/1972 | Daniel et al. ............ 56/12.7 |
| 4,126,186 A | | 11/1978 | van der Lely |
| 4,195,695 A | | 4/1980 | Dixon |

(Continued)

*Primary Examiner*—Thomas B Will
*Assistant Examiner*—Matthew D Troutman
(74) *Attorney, Agent, or Firm*—Keaty Professional Law Corporation

(57) ABSTRACT

A furrow/ditch cleaner has a rotating wheel with elongate blades that contact the obstructing matter in the eye of the furrow and move the obstruction to the side of a field row. The blades are secured on radial arms attached to the central shaft of the wheel. The wheel is towed by a farming implement causing the blades to enter the furrow and move across the bottom of the furrow. The distance between the blades and their extension from the central shaft is adjusted by extending the length of the telescoping arms. A ditch cleaning member is secured to distant ends of each blade, encircling the blades a distance from an end of each blade. The ditch cleaning member moves along a transverse ditch compacting soil and debris in the ditch and leveling the ditch for the water flow.

4 Claims, 5 Drawing Sheets

U.S. PATENT DOCUMENTS

| | | |
|---|---|---|
| 4,237,984 A | 12/1980 | Cobb et al. |
| 4,360,065 A * | 11/1982 | Jenison et al. ............... 172/119 |
| 4,508,177 A | 4/1985 | Wiser |
| 5,103,624 A * | 4/1992 | Marshall ...................... 56/192 |
| 5,318,134 A * | 6/1994 | Jensen ......................... 172/44 |
| 5,953,895 A | 9/1999 | Hobbs |
| 6,101,800 A | 8/2000 | Juraco et al. |
| 6,539,697 B2 | 4/2003 | Burk |

* cited by examiner

FURROW/DITCH CLEANER APPARATUS

CROSS-REFERENCE TO RELATED APPLICATIONS

This application is a continuation-in-part of my co-pending application Ser. No. 10/860,444 filed on Jun. 3, 2004, entitled "Furrow Cleaner Apparatus," abandoned, the priority of which is hereby claimed and the full disclosure of which is incorporated by reference herein.

BACKGROUND OF THE INVENTION

This invention relates to a soil-working machine, and more particularly to an apparatus for opening obstructed furrows and ditches.

The furrows are irrigation channels with planting beds aligned between the ditches. The furrows have sloping sides, narrow bottoms and increasing tops. The seeds are planted on top of the rows, while the bottom of the furrow serves as a channel for allowing water to flow between transverse channels, or ditches and the furrow. Since the field oftentimes presents an uneven terrain, depressions in the soil may form along the furrows. These depressions tend to accumulate water, while soil elevations prevent water from properly draining into the ditch or from being properly delivered from the ditch to irrigate the plants.

Sometimes, leaves and plant parts accumulate in the main ditches and special machines are employed to clear them. Such machines move through the field, throwing debris, dirt or sand from the cleaned path to the sides of the rows and into the furrows. As a result, the areas immediately adjacent to the main ditch become blocked by the mounds of soil, preventing water from freely flowing from and into the furrows. The water tends to accumulate in the eye of a furrow, making the soil soggy and potentially damaging nearby plants. Ideally, the furrows should maintain a constant depth in relationship to the irrigation channels and to the rows, thus allowing efficient use of water.

Conventionally, after a specialized tractor attachment referred to as a ditch digger passed through the field, the furrows need to be cleaned. It is often done by hand, a job that is time consuming and labor intensive. Some of the older technical solutions to this problem include furrow-cleaning apparatuses that have spoked or toothed trash-clearing fingers that dig into the furrows to help remove the trash from the critical areas adjacent the irrigation ditch. While some of these machines may work satisfactorily under favorable conditions, many of such older devices have difficulty going through wet mud and clearing soggy soil from the furrow entrance.

Additionally, the ditches that are cut across the rows and across the furrows become clogged with debris and fail to provide the much needed drainage. Manual clearing of the ditches is expensive and time-consuming. There exists, therefore, a need for a means for cleaning furrows and ditches in the field, which can operate in dry as well as wet soil conditions.

SUMMARY OF THE INVENTION

It is, therefore, an object of the present invention to provide a furrow eye opening apparatus that can be employed for removing soil closing the entrance to the furrow from an irrigation ditch.

It is another object of the present invention to provide a furrow cleaning apparatus that can operate in dry as well as soggy soil conditions.

It is a further object of the present invention to provide a furrow cleaner that can be combined with a ditch clearing means and attached to a conventional farm implement, such as a tractor, to be towed across the field during operation.

These and other objects of the present invention are achieved through a provision of a furrow cleaner apparatus adapted for attachment to a towing implement, for instance a tractor. The furrow cleaner has a wheel, which rotates about a central shaft in a direction transverse to the direction of travel of the implement. The wheel has a plurality of elongate blades, which contact the soil and move obstructing material to a side of a field row. The blades move in dimensional symmetry with respect to the plane of rotation of the wheel so as to retain a constant alignment of the blades with a furrow. The depth of contact of the blades with the ground remains constant.

Each blade has a main part and a pair of opposing end portions. The end portions extend at a substantially acute angle in relation to the longitudinal axis of the main part. The end portions, when contacting the soil in the furrow, help preventing crumbling of the soil in the area where the ends of the blades contact the soil.

The central shaft carries a plurality of arms or spokes extends from the disks in radial directions in relationship to the central shaft. The blades are attached to free ends of the radial arms and extend across several sets of parallel arms. The arms have adjustable longitudinal dimensions through a provision of telescoping portions, which allow extension of the blades to a pre-determined selected distance from the central shaft. This feature allows adjustment of the wheel for use in differently spaced rows and furrows.

A ditch cleaning member is secured to the edge of the main portion of each blade. The ditch cleaning member may have a ring-shaped configuration or may be comprised of a plurality of arcuate portions secured to the blades and extending transversely to the longitudinal axes of the blades. The ditch cleaning member is positioned on the wheel in a location away from the ends of the blades and contact the irrigation ditch, compacting the soil and debris in the ditch to improve the irrigation flow.

The wheel is secured to the tractor by a hitch and a yoke, which engages opposite ends of the central shaft. The side arms, or rails of the yoke have greater length than the length of the radial arms so as not to interfere with the proper operation of the furrow cleaner.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 1:
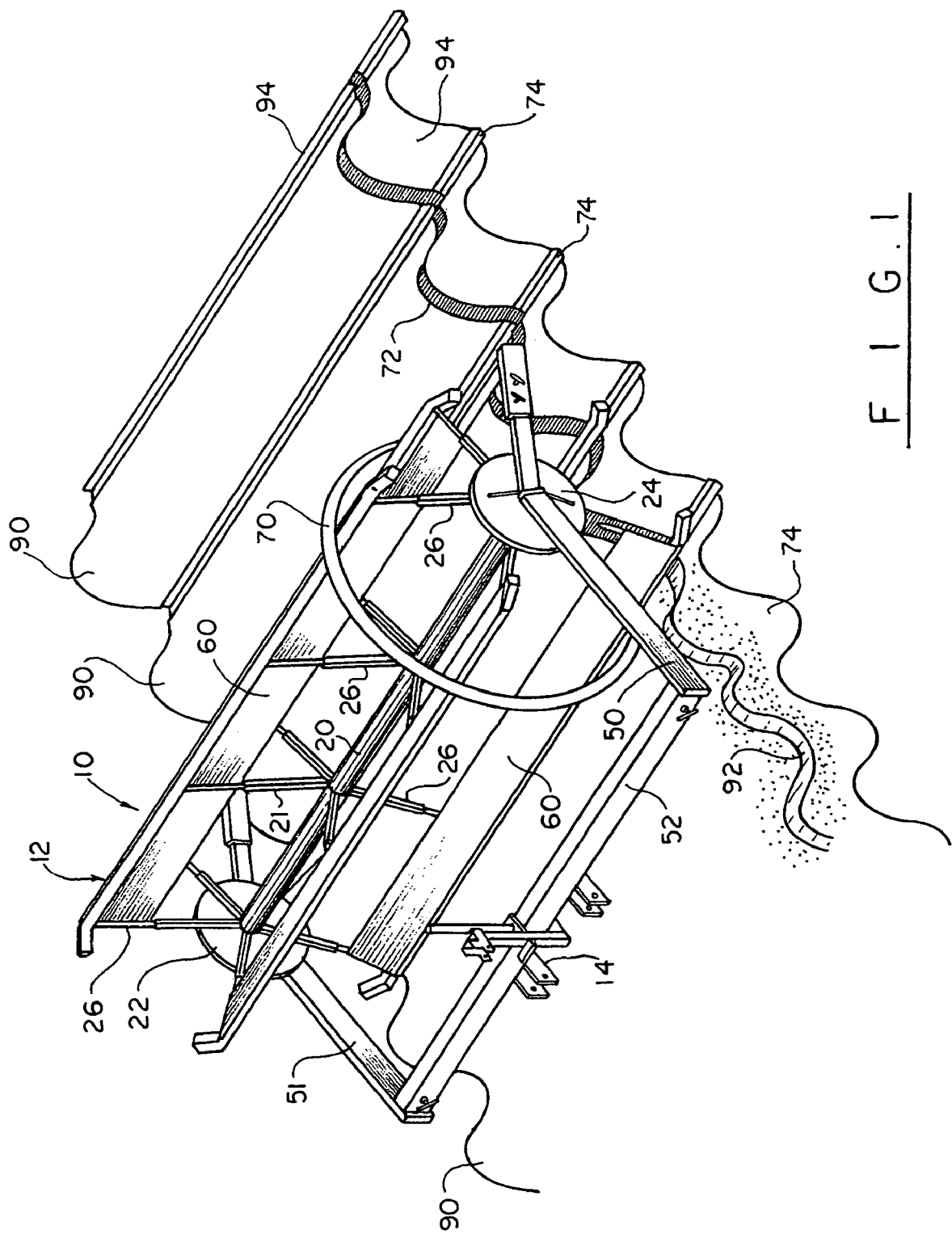
FIG. 1 is a perspective view of the apparatus of the present invention positioned in a field.
Figure 2:
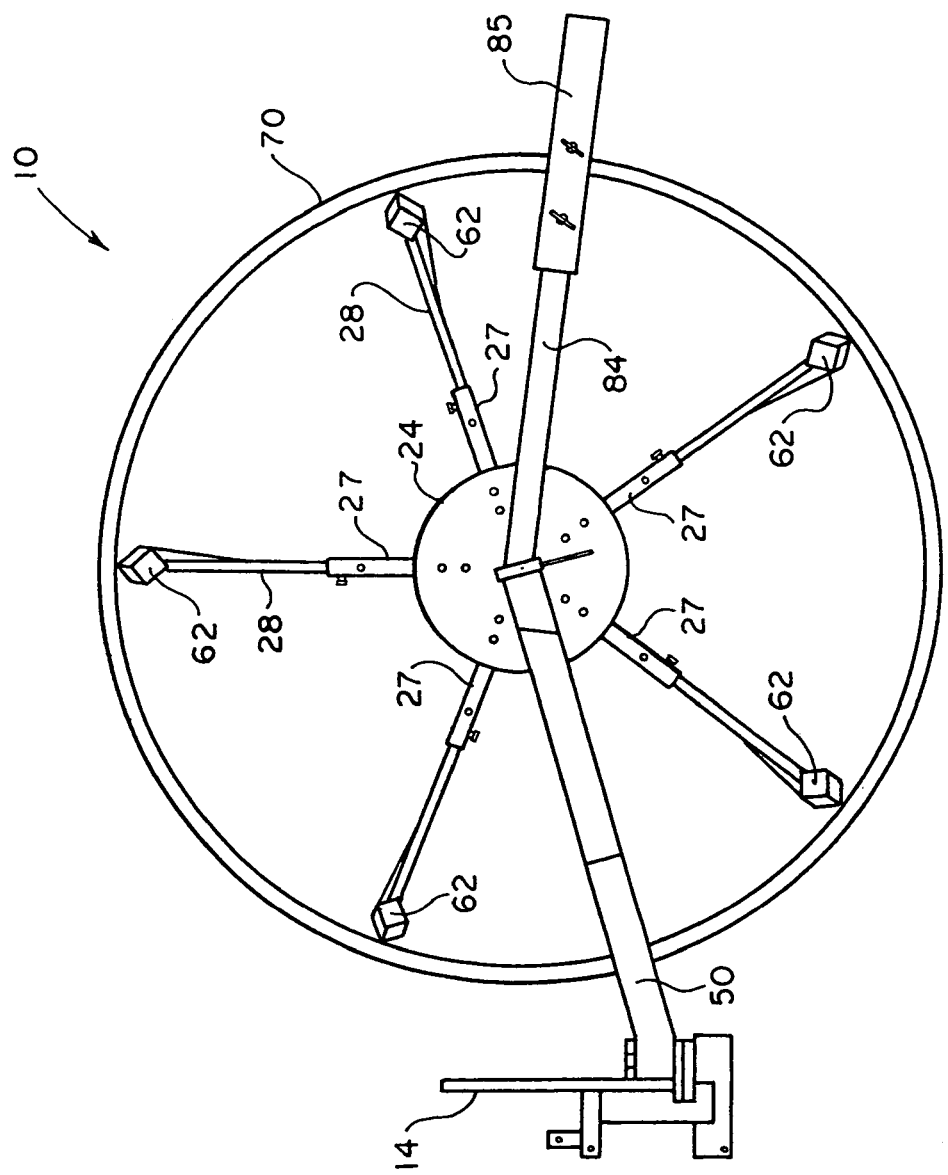
FIG. 2 is a side view of the furrow/ditch cleaner in accordance with the present invention.

Turning now to the drawings in more detail, numeral 10 designates the furrow/ditch opener of the present invention. The furrow opener 10 comprises a wheel 12 and an attachment assembly 14 adapted for securing the apparatus 10 to a towing implement, for instance a tractor (not shown). The wheel 12 comprises an elongated central shaft 20 carrying disks 22 and 24 on opposite ends thereof. Secured to the shaft 20 is a plurality of radially extending arms 26, which can be secured to the shaft 20 to radiate from two or more locations along the length of the shaft 20.

Each radial arm 26 has an inner portion 27 (closer to the shaft 20) and an outer portion 28 (away from the shaft 20). A part of the portion 28 telescopically extends within the larger size portion 27, allowing to adjust the longitudinal dimension of each arm 26 to accommodate the wheel 12 for use in the fields with different distances between the furrow centers. Of course, depending on the manufacturing design, it may be preferred to have the arms 26 without the telescoping portions if the apparatus 10 is set for standard operations in a field. The proximal ends of the portions 27 are securely attached to the shaft 20 by detachable securing means, for instance bolts and respective nuts (not shown). Alternatively the arm portions 27 can be welded to the shaft 20, if desired.

A locking pin 30 passes through corresponding openings formed in the portions 27 and 28 to retain the inner and outer portions of the arms 26 at a desired pre-determined extension from the center of the shaft 20. In the preferred embodiment, the arms 26 can be formed from hollow tubular members, for instance rectangular tubing and the disks 22, 24 can be formed from flat non-corrosive plates of about 25 inches in diameter.

A retainer 40 is secured on an end 42 of the central shaft 20. A second retainer 44 is secured on the opposite end 46 of the shaft 20. The retainers 40 and 44 are designed to engage with a mounting yoke 48, which secures the wheel 12 to the tractor 16. The retainer 40 and 44 may be detachably secured on the ends 42 and 46 of the shaft 20.

The mounting yoke 48 comprises elongated side arms 50, 50 detachably securable to the retainers 40 and 44 and connected by a cross member 52, which is secured on free ends of the side arms 50, 51. The attachment assembly 14 is detachably engageable with the cross member 52, allowing to pull the wheel 12 along the field. The side arms 50, 51 and the cross member 52 may be formed from a hollow tubular material, similar to the tubular material of the arms 26.

Extending in a parallel relationship to the central shaft 20 is a plurality of elongated blades 60, each of which is secured to free ends of the outer portions 28 of the arms 26. The cleaning apparatus illustrated in FIGS. 1-5 shows a wheel 12 having five blades 60. Of course, a different number of the blades may be used, depending on the particular design of the furrow cleaning apparatus.

Each blade 60 has an elongated central part 61 and angularly inwardly turned end portions 62, 63, which are oriented towards the center shaft 20. The end portions 62, 63 extend at an acute angle in relation to a longitudinal axis of the central part 61 of each blade 60. The end portions 62, 63 help smooth out and compact the soil at the ends of the blade 60 extensions, so that instead of a sharp depression a smoother line of compacted soil is achieved. Without the offset end portions 62, 63, the line of soil moved by the ends of the blades 60 would have been at an approximately perpendicular angle to the line of the furrow and may crumble.

A ditch cleaning member 70 is secured to exterior edges of each blade 60, encircling the wheel 12. The ditch cleaning member 70 may be made as a ring-shaped unitary member, as shown in FIGS. 1-5 or, alternatively, comprised of a plurality of separate arcuate portions attached to the blades 60, forming an interrupted circle. The ditch cleaning member 70 is secured to the blades 60 a distance away from the end portions 62, in an approximate location where the ditch cleaning member 70 is expected to come into contact with the ditch 72.

If desired, the ditch cleaning member formed as a circular body may have telescopically extending features that can be accomplished by introducing a different diameter portions in the structure of the circular member 70 and engaging adjoining ends in a telescoping manner. Should telescoping extension of the radial arms 26 become necessary, the ring 70 can be temporarily removed from the wheel 12, extended to achieve a desired diameter, and then re-positioned again with suitable securing means, such as bolts, nuts and the like to the extended arms 26.

The ditch cleaning member 70 is designed to move along the ditch 72 (FIG. 1), slightly compressing the soil and/or debris collected in the ditch 72 and improving drainage flow through the ditch 72. As a result, the bottom of the ditch 72 becomes more level, facilitating water flow between the ditch 72 and furrows 74.

Figure 3:
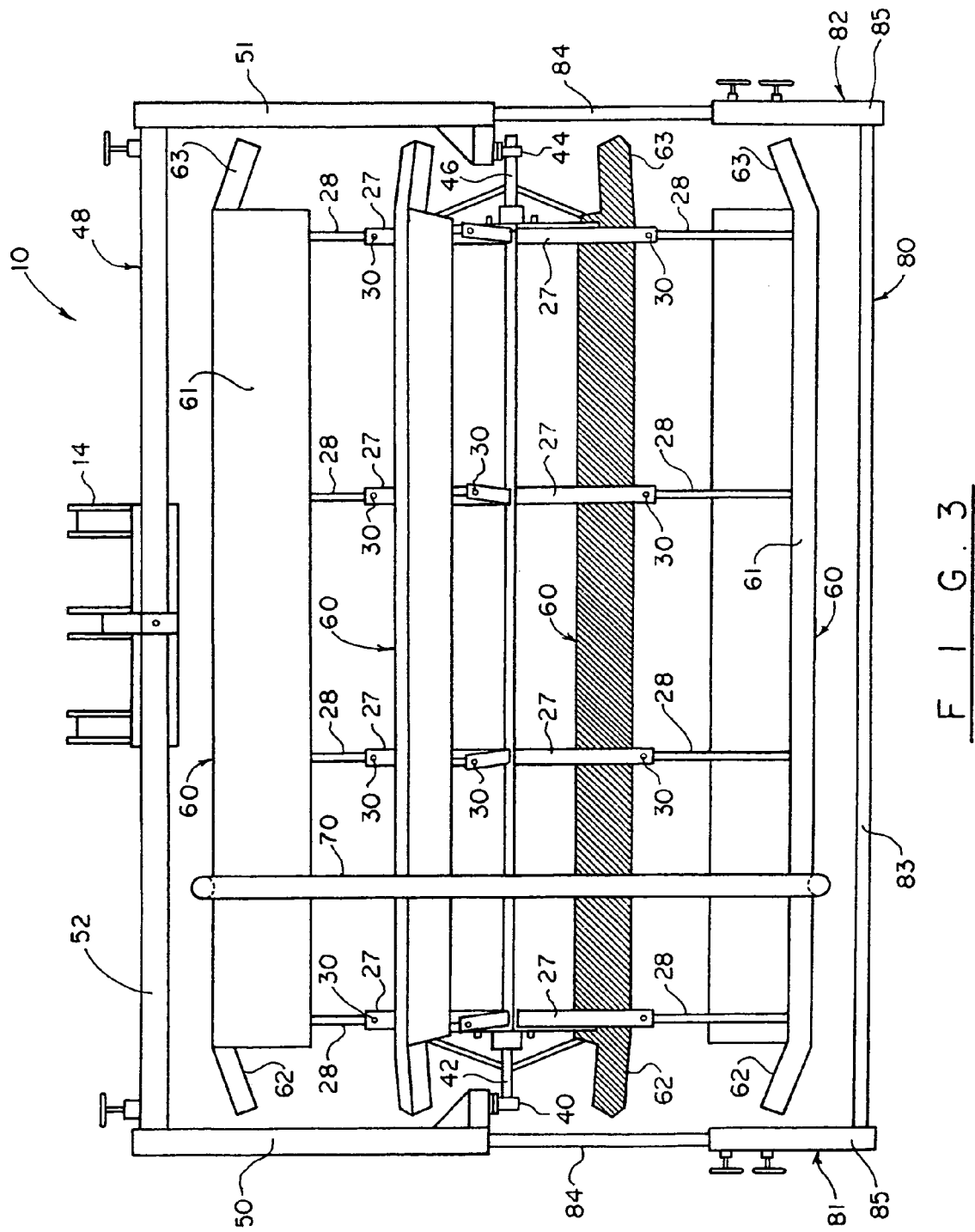
FIG. 3 is a top view of the apparatus of the present invention.
Figure 4:
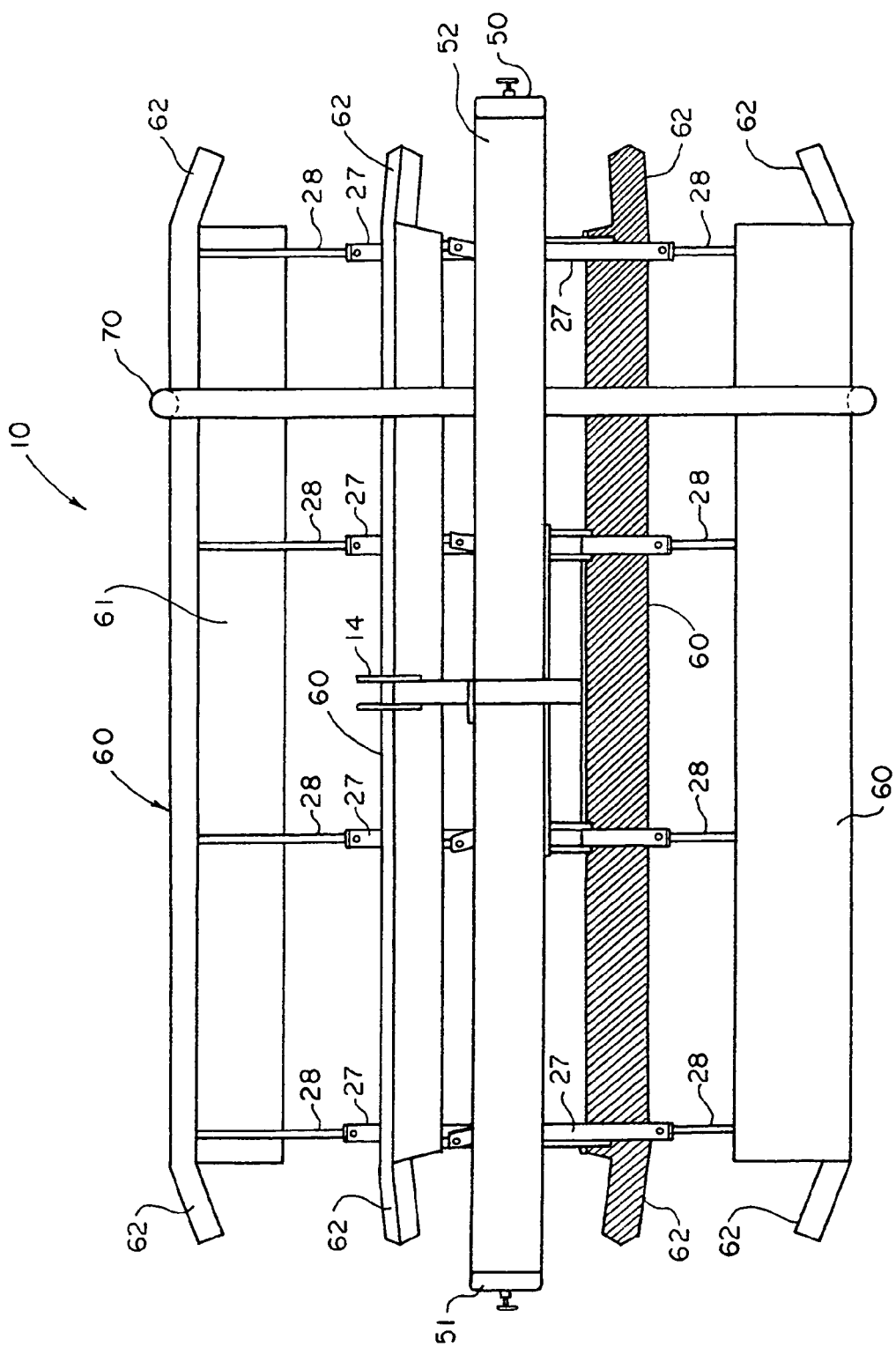
FIG. 4 is a front view of the furrow/ditch cleaning apparatus of the present invention.
Figure 5:
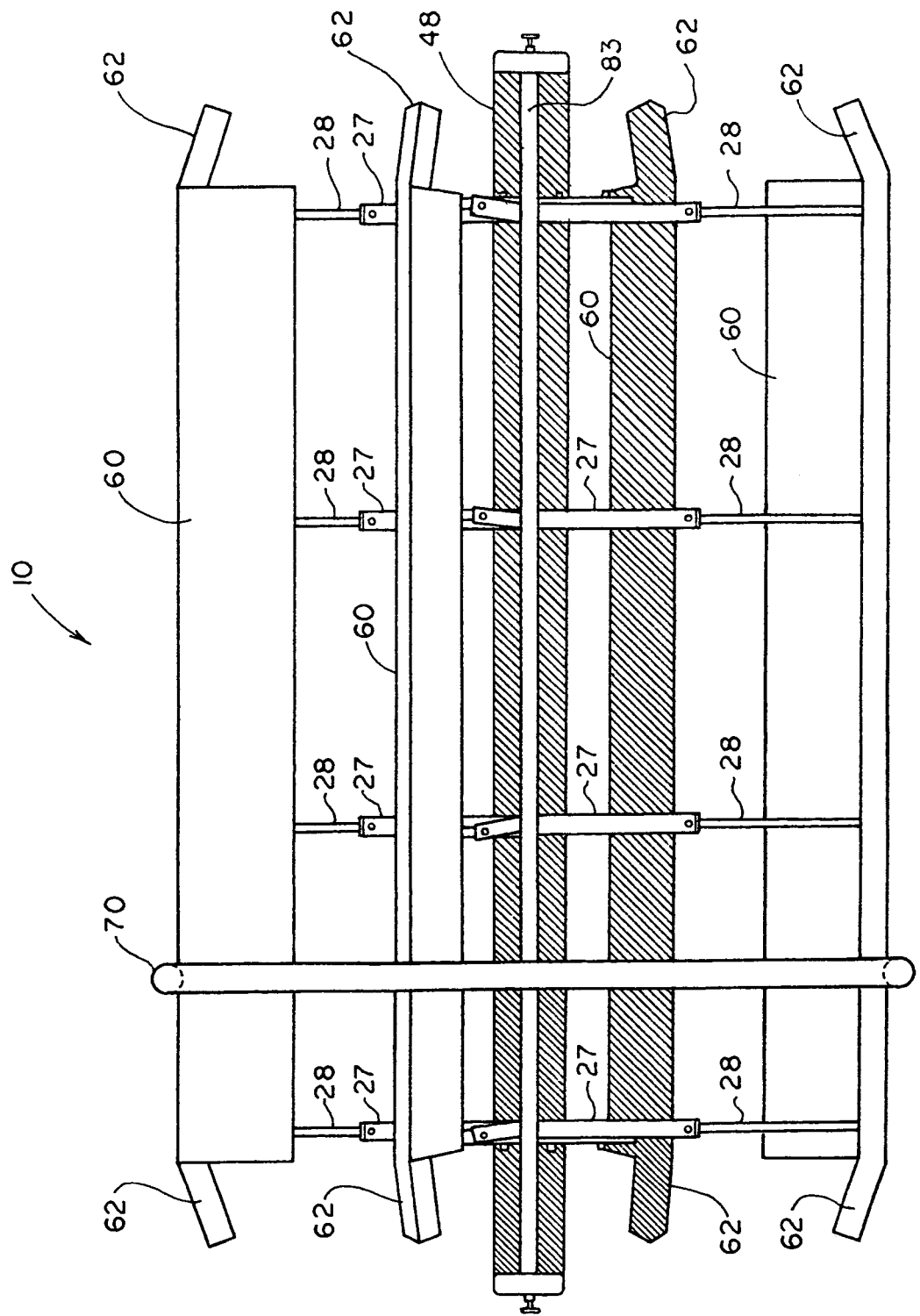
FIG. 5 is a rear view of the furrow/ditch cleaning apparatus of the present invention.

A stabilizing yoke 80 is detachably securable to the mounting yoke 48 and extends on a side of the wheel 12 opposite the mounting yoke 48. The stabilizing yoke 80 comprises a pair of parallel opposing arms 81, 82 connected by a transverse member 83. The arms 81, 82 may be made extendable in a longitudinal direction by forming the arms with telescoping portions 84, 85, as shown in FIG. 3. The telescopically extendable arms 81, 82 are designed to accommodate a possible extension of the radial arms 26.

As can be seen in FIG. 1, the field is comprised of a plurality of rows 90 divided by furrows 74, which extend transversely to an irrigation ditch 72. The irrigation ditch, or cross drain, 72, normally allows water to drain out of the furrows 74, into the ditch 72 when no obstruction is formed in the furrow adjacent to the center ditch 72. However under certain circumstances, the ends of the furrows and the ditch 72 become clogged with dirt build up, as schematically illustrated in FIG. 1 and designated by numeral 92. The build up 92 prevents water from traveling freely along the drain channel 72 and along the furrows 74. The instant apparatus 10 is designed to rectify this problem.

In operation, the furrow opener 10 is attached to a tractor with the attachment assembly 14 and the cross member 52. The wheel 12 is allowed to freely rotate about the central shaft 20 between the side arms 50, 51 and 81, 82. As the wheel 12 rotates, the blades 60 move in turn across the bottoms of the furrows 74, forcing the accumulated obstructing material to move to the sloping side 94 of the row 90. Since the distances between the furrows 74 may differ, the operator, prior to using the wheel 10, adjusts the length of the arms 24 such that the distance between adjacent arms 24 is approximately equal to the distance between the centers of the adjacent furrows 74.

As an example, in a sugarcane field, the typical distance between the furrows 74 is about 70 inches. The arms 26 may have an approximate length of about 59-60 inches, such that the blades 60 move across the bottoms of the furrows with the revolution of the wheel 12, forced to advance along the field by the tractor. The length of the arms 26 can be also adjusted to accommodate the need for greater or less depth to form a compressed, smooth sidewall 94 of the row 90.

The end portions 62, 63 smooth out the furrows 74 and the sidewalls 94 preventing crumbling of the soil that might have occurred with a sharp blade. At the same time, the ditch cleaning member 70 contacts the ditch 72 compacting the displaced soil in the ditch 72. The cleaning action of the furrow-cleaning machine of the present invention includes the depth control of the furrows while retaining the size of the rows relatively compacted to prevent erosion by water.

The furrow cleaning apparatus 10 of the present invention is easily manufactured and maintained since it is made of lightweight tubular material that can be easily propelled along the field with conventional farm implements. The radial arms 26 keep the blades 60 in a substantially constant pivotal position relative to the ground, when the extension of the blades 60 from the center shaft 20 is properly adjusted by the user prior to attachment of the wheel 12 to the tractor.

The tractor wheels moving across the field may leave a certain depression in the soil. However, the blades 60 following the tractor will remedy this problem and open the furrows again. The apparatus 10 can be used following a ditch digger operation, or following heavy rain, or when needed. By moving the blades 60 in the furrows 74 and the ditch cleaning member 70 in the ditch 72, the apparatus 10 of the present invention again clears the furrows and the ditches, returning the field to the desired position of setting irrigation channels of equal depth throughout the field. The weight of the wheel 12 is sufficient to press down the mud with the blades 60 and the ditch cleaning member 70.

Many changes and modifications may be made in the design of the present invention without departing from the spirit thereof. I, therefore, pray that my rights to the present invention be limited only by the scope of the appended claims.

I claim:

1. A method of clearing a plurality of irrigation furrows and transverse irrigation ditches formed in a field, comprising the following steps:
   providing a towing implement;
   providing a rotatable wheel with a central shaft, said wheel comprising a plurality of furrow-opening elongated blades supported in a substantially parallel relationship to the central shaft and transversely to a path of travel of the implement;
   providing each of said blades with opposing end portions that extend at a substantially acute angle in relation to a longitudinal axis of a respective blade;
   providing a ditch clearing member carried by distant edges of said elongated blades;
   securing said wheel behind the towing implement;
   imparting rotation on said wheel and causing at least one of the blades to move across the bottom of a furrow, thereby moving obstructing material from the bottom of the furrow to a side of an adjacent row, while causing said ditch clearing member to move along a transverse irrigation ditch and compact displaced soil and debris in the ditch.

2. The method of claim 1, further comprising a step of maintaining contact edges of the blades at a substantially constant vertical position relative to the ground.

3. The method of claim 1, further comprising the step of causing said end portions of the blades to contact furrows and prevent crumbling of the soil in an area of contact of opposite ends of each blade with the soil.

4. A method of clearing a plurality of irrigation furrows and transverse irrigation ditches formed in a field, comprising the following steps:
   providing a towing implement;
   providing a rotatable wheel with a central shaft, said wheel comprising a plurality of furrow-opening elongated blades supported in a substantially parallel relationship to the central shaft and transversely to a path of travel of the implement;
   providing a ditch clearing member carried by distant edges of said elongated blades;
   selectively adjusting relative extension of the blades from the central shaft to accommodate spacing between the irrigation furrows;
   securing said wheel behind the towing implement;
   imparting rotation on said wheel and causing at least one of the blades to move across the bottom of a furrow, thereby moving obstructing material from the bottom of the furrow to a side of an adjacent row, while causing said ditch clearing member to move along a transverse irrigation ditch and compact displaced soil and debris in the ditch.

\* \* \* \* \*